United States Patent [19]
Bryant et al.

[11] Patent Number: 5,415,196
[45] Date of Patent: May 16, 1995

[54] TANK VAPOR PRESSURE CONTROL SYSTEM

[76] Inventors: Billy O. Bryant; Glen C. Bryant; Douglas D. Drube; Shannon L. Lowe, all of 3737 Gilmore Ave., Bakersfield, Calif. 93308

[21] Appl. No.: 163,862

[22] Filed: Dec. 8, 1993

[51] Int. Cl.⁶ .............................................. F17C 7/02
[52] U.S. Cl. ..................... 137/14; 62/48.1; 62/48.2; 137/210; 137/340; 137/587; 141/59; 141/65; 141/82; 141/290
[58] Field of Search .................. 137/14, 587, 210, 334, 137/340; 62/48.1, 48.2, 48.3, 47.1; 141/51, 59, 65, 82, 290

[56] References Cited

U.S. PATENT DOCUMENTS

| | | | |
|---|---|---|---|
| 3,791,422 | 2/1974 | Johnson | 62/47.1 X |
| 3,956,903 | 5/1976 | Hiller | 62/48.2 X |
| 4,100,758 | 7/1978 | Mayer | 62/47.1 |
| 4,671,071 | 6/1987 | Sasaki | 62/47.1 |

Primary Examiner—Robert G. Nilson
Attorney, Agent, or Firm—Lyon & Lyon

[57] ABSTRACT

A vapor pressure control system for controlling the vapor pressure in a fuel storage tank is provided which comprises a cooling chamber for cooling the fuel vapor, wherein the temperature of the cooling chamber is maintained at a point slightly above the freezing point of water. Vapor intake and return lines provide for communication of the fuel vapor between the tank and the cooling chamber. A fan interposed in the intake line causes the circulation of the fuel vapor between the tank and the cooling chamber. The fan is operated by a pressure sensitive switch which causes the fan to run when the difference between the ambient air pressure and tank vapor pressure falls below a certain minimum level, and which causes the fan to stop when the difference between the ambient air pressure and tank vapor pressure rises above a certain, maximum level. The fan is shut off by a temperature sensitive switch when the ambient temperature approaches the freezing point of water.

8 Claims, 1 Drawing Sheet

TANK VAPOR PRESSURE CONTROL SYSTEM

BACKGROUND OF THE INVENTION

The present invention relates to fuel tank pressure control systems and, more particularly, to an automatic, pressure and temperature operated, vapor pressure control system for controlling vapor pressure and maintaining a sufficient vacuum in a fuel storage tank.

Enclosed tanks or containers which store all forms of gases, or liquids that expand or convert at varying temperatures into gases, share one basic problem: the internal vapor pressure must be controlled. Where the tank is used to store fuel to be pumped or otherwise removed from the tank, such as gasoline or diesel, it is desirable to maintain a sufficiently low vapor pressure relative to the external or "ambient" air pressure to create a vacuum in the tank in order to prevent the fuel vapor from being vented to atmosphere during the dispensing procedures. A relative vacuum also assists in the dispensing of the fuel from the tank by drawing outside air or, more commonly, vapor from the tank of a vehicle into which the fuel is being pumped, into the storage tank to displace the fuel being removed.

For instance, in a "gas station" type operation, fuel is stored in a tank which is in communication with a pump or other type of dispensing mechanism. Typically, the fuel in the tank is in both a liquid and vapor state. Since the storage tank has fixed dimensions, if the fuel is heated, e.g., by a temperature increase or by warm vapor from the tank of the vehicle being drawn into the storage tank during the dispensing procedure, it will expand causing an increase in vapor pressure within the tank. If the storage tank vapor pressure increases to a level above the ambient air pressure, it becomes difficult, if not impossible, to draw the vapor from the vehicle into the storage tank to replace the fuel being pumped. This objectionable variation in pressure is particularly aggravated in fuel storage tanks located above ground, which are subject both to changes in the ambient temperature and to direct sunlight transferring heat through the sides of the tank.

Known fuel tank vapor pressure control methods include the use of a pressure sensitive, relief valve mechanism incorporated into a wall of the tank, which is set to expel vapor from the tank if the vapor pressure becomes too great. The release of the vapor decreases the volume of fuel stored in the tank and, correspondingly, decreases the vapor pressure and temperature. By setting the release valve mechanism to expel vapor and maintain the tank vapor pressure at a predetermined level below the ambient air pressure, a vacuum will also be maintained.

In the case of flammable or environmentally harmful gases being expelled by the release valve mechanism, such as the case with gasoline vapor, it should be burned off immediately upon discharge from the tank. To do this, an open flame is provided downstream of the release valve opening to burn off the vapor. This adds cost, complexity and safety hazards, in addition to the lost fuel which is expelled and burned off, to the fuel storage and dispensing operation.

Most all fuels contain at least some amount of water. Thus, when the outside temperature is near, or below freezing, (i.e., approximately less than 35 degrees fahrenheit), there is no need for a tank vapor pressure control system, since maintaining a pressure vacuum under those conditions will cause the temperature of the fuel or liquid in the tank to be lowered below the freezing point of whatever water is present, causing it to freeze, thereby creating difficulties in the proper dispensing of the fuel. Because it is often the case that the external temperature will vary dramatically over a twenty-four hour period, i.e., cold during the night and hot during the day, the "burn off" element, i.e., the open flame, must either be maintained during the time period when no fuel is being expelled from the tank, thereby requiring an additional fuel supply, or it must be capable of being operated only when fuel is being expelled, thereby requiring an ignition system. In either case, additional cost, maintenance problems and complexity is added to the operation.

Thus, it is desirable to provide a system for fuel tank vapor pressure control which is capable of maintaining the tank vapor pressure at a level which provides an adequate vacuum for efficient dispensing of the fuel, without releasing any vapor from the tank. It is further desirable that such a system be capable of automatically operating only when the ambient temperature conditions so require.

SUMMARY OF THE INVENTION

With the present invention, an automatic tank vapor pressure control system is provided, comprising the placement of a cooling chamber in closed communication with the vapor of a storage tank. A temperature controlled refrigeration unit is used to maintain the temperature of the cooling chamber. During operation, the relatively warm fuel vapor from the storage tank is circulated through the cooling chamber by a fan, thereby cooling the vapor and lowering the vapor pressure in the storage tank. The contraction of the cooled vapor creates a vacuum which assists in drawing the warm vapor from within the storage tank into the cooling unit. The cooled vapor is then cycled back into the storage tank by the force of fan, where it mixes with the warmer vapor and lowers the vapor temperature, thereby reducing the vapor pressure.

In a preferred embodiment, the fan is controlled by both pressure and temperature sensitive switch elements. A pressure differential operated switch element is provided which measures the pressure differential between the ambient air and the tank vapor. If the differential falls below that point necessary to maintain a sufficient vacuum for proper dispensing of the fuel, the switch element will cause the fan to start. Conversely, if the pressure differential becomes too great for proper operation, the switch element will cause the fan to stop.

A temperature operated switch element is provided which will override the pressure differential switch and stop the fan, regardless of the measured pressure differential, if the external temperature falls to a point near freezing.

As the fuel is drawn out of the storage tank, relatively warm vapor from the vehicle's fuel tank is drawn into the storage tank to displace the dispensed fuel, where it mixes with the relatively cool fuel vapor. This increases the temperature of the vapor in the storage tank and causes the tank pressure to increase. However, as the vapor within the storage tank circulates through the cooling chamber, it is cooled and the tank pressure decreases. This process continues until the storage tank is empty.

Since the cooling unit is provided in closed communication with the contents of the storage tank, there is no vapor expelled. Thus, no release valve mechanism and associated "burn off" element is required.

Accordingly, it is an object of the present invention to provide an improved vapor pressure control system for fuel storage tanks. Other objects and features of the present invention will become apparent from the following detailed description taken in connection with the accompanying drawing.

BRIEF DESCRIPTION OF THE DRAWING

It is to be understood that the accompanying drawing is designed for the purpose of illustration only, and is not intended as a definition of the limits of the invention. The drawing schematically illustrates cross-sectional elevation of a fuel tank having a preferred embodiment of the present invention connected in closed communication with the vapor contents of the tank.

DETAILED DESCRIPTION OF THE DRAWING

Figure 1:
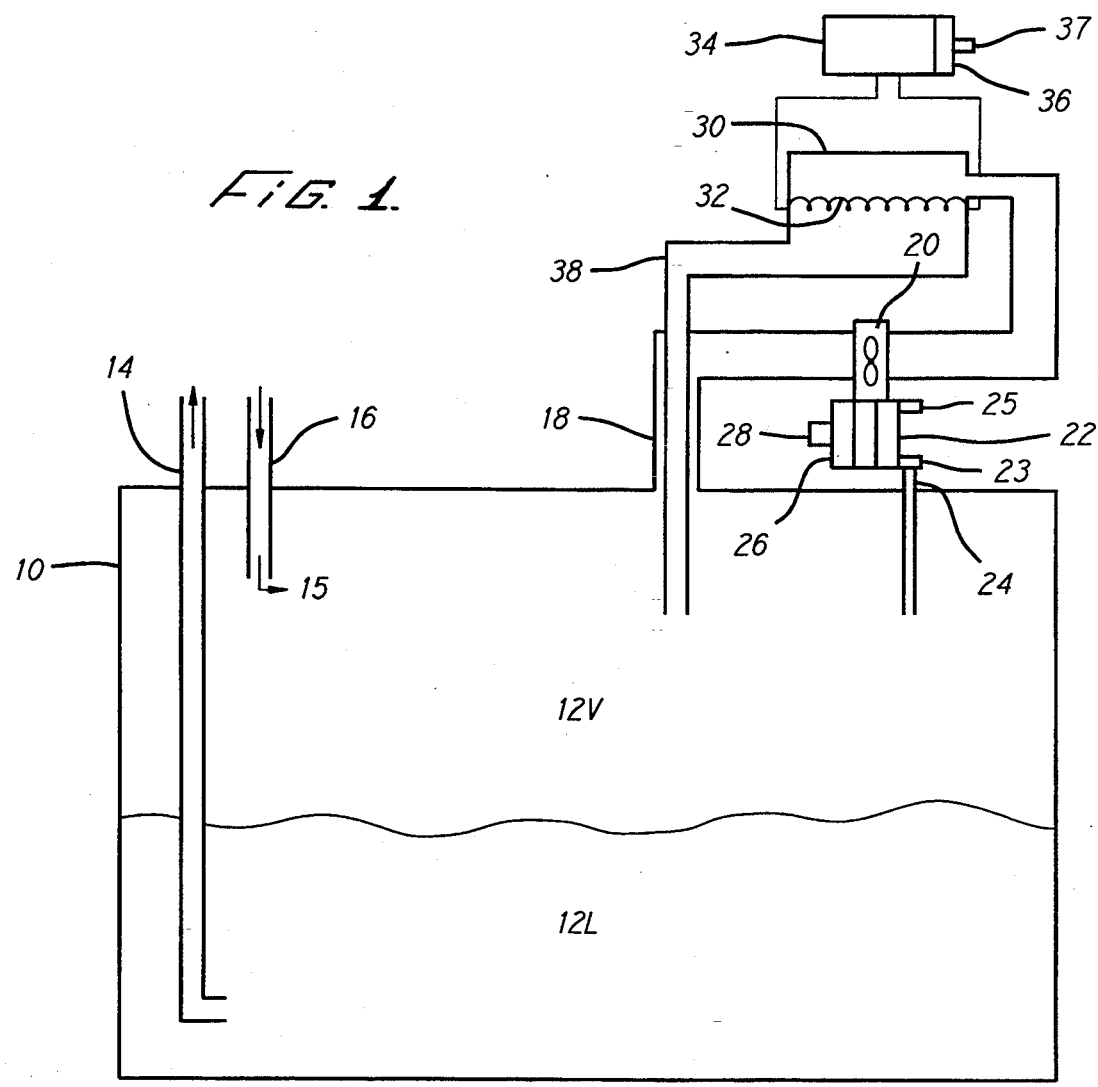

Referring now to the drawing, there is shown a fuel storage tank 10 containing fuel 12, such as gasoline or diesel. The fuel is in both a liquid 12L and vapor 12V state. A fuel outlet line 14 is provided for the fuel to be drawn out of the tank 10 during the dispensing procedure, either by a pump or other means (not shown). An tank inlet line 16 is provided to allow fuel vapor from the vehicle tank 15 to enter the storage tank 10 to displace the fuel being dispensed through the fuel outlet line 14. Once inside the tank 10, the vapor from the vehicle 15 mixes with the fuel vapor 12V in the tank 10. Both the outlet and inlet lines, 14 and 16, respectively, have one-way flow mechanisms (not shown) to maintain a pressure differential between the outside air and the inside of tank 10.

One end of a vapor intake line 18 is connected to a top surface of tank 10, such that the vapor 12V in the tank is in direct communication with intake line 18. For instance, the vapor intake line 18 may be connected to the tank 10 via a flange, weld, or other means. A second end of vapor intake line 18 is connected to one side of an enclosed cooling chamber 30, in a manner which allows the vapor 12V from the tank to communicate freely between the interior of tank and the interior of the cooling chamber. The operation of the cooling chamber 30 is described in greater detail herein.

Interposed in the vapor intake line 18, between the tank 10 and cooling chamber 30, is a fan 20, driven by a motor 21. When the fan 20 is operating, it causes the vapor 12V within the vapor intake line 18 to be blown into the cooling chamber 30. The fan motor 21 is operated by both pressure and temperature operated switches in the following manner (A source of power to drive the motor must also be provided, but is not shown in the drawing):

A pressure differential operated switch 22 is provided which is capable of turning on and off the fan motor 21. A first pressure measuring transducer 23 which measures the tank vapor pressure via a pressure sensing line 24 is connected to switch 22. Pressure sensing line 24 is inserted into tank 10 far enough from the interior top surface of the tank to avoid a false reading due to the draft created by vapor entering vapor intake line 18 from within the tank. A second pressure measuring transducer 25, which measures the ambient pressure, is also connected to switch 22. For applications where the fuel tank is buried, a second pressure sensitive line must be provided to allow transducer 25 to read the atmospheric pressure above the surface.

By determining the difference between the readings of transducers 23 and 25, respectively, switch 22 is capable of determining the pressure differential between the tank vapor and the atmosphere and causes the fan motor 21 to run when the pressure differential falls below a certain, minimum threshold point and to stop when the pressure differential rises above a certain, maximum threshold point. The minimum and maximum pressure differential threshold points are adjustable and depend upon the desired operating conditions for the fuel tank dispensing procedure.

A temperature operated switch 26 is also provided for fan motor 21 which is capable of overriding the "run" position of switch 22. A variable thermostat controller 28 is connected to switch 26 which measures the ambient temperature. The thermostat controller 28 will cause switch 26 to override switch 22 and shut off fan motor 21 if the ambient temperature falls below a selected temperature, regardless of the pressure differential measured by switch 22. This "shut-off" temperature is adjustable but will normally be set slightly above the freezing point of water.

One end of a vapor return line 38 is connected to, and communicates with the interior of, the cooling chamber 30 on a side opposite to the connection location of the vapor intake line 18. Another end of the vapor return line 38 is connected to tank 10 such that the vapor in the cooling-chamber 30 is allowed to communicate freely between the interior of the cooling chamber 30 and the interior of tank 10. When the fan 20 is running, it will cause the vapor to circulate at a steady velocity from the interior of the tank 10, through the vapor intake line 18, into cooling chamber 30, through the vapor return line 38, and back into the tank. The cooling chamber is sealed in a manner which does not allow the vapor to escape, except through the opposing openings where the vapor intake and return lines, respectively, are connected. In this manner, the vapor 12V in the tank is in closed communication with the cooling chamber.

The temperature within the cooling chamber 30 is maintained by a refrigerated condensing coil 32. The ends of the condensing coil 32 pass through the sides of the cooling chamber 30 and into an adjacent refrigeration plant 34. The refrigeration plant 34 chills the condensing coil 32 and is controlled by a temperature sensitive switch 36. (A source of power to drive the refrigeration plant must also be provided, but is not shown in the drawing).

Switch 36 is provided with a thermostat controller 37, which is in communication with, and measures the temperature of, the interior of the cooling chamber 30. Switch 36 is adjustable and may be set to shut the refrigeration plant 34 off if the temperature within the cooling chamber 30 drops below a predetermined temperature. In this manner, the temperature within the cooling chamber can be regulated.

Having described the apparatus, the operation of the vapor pressure control system will now be set forth in greater detail.

The vapor 12V within the interior of the tank 10 will have a particular pressure, depending upon the volume, temperature, and liquid to gas ratio of the fuel 12 inside the tank. Since the storage tank 10 has fixed dimensions, if the fuel 12 is heated, e.g., by an external temperature increase or by warm vapor from the vehicle 15 being drawn into the tank via inlet line 16, it will expand causing an increase in the vapor pressure within the tank. In order to maintain the tank vapor pressure at a level sufficiently below the ambient air pressure, the minimum threshold of switch 22 is set to cause the fan motor 21 to operate the fan 20 as soon as the pressure differential becomes too small for proper dispensing operation.

When the fan 20 is running, the tank vapor 12V will be blown through the cooling chamber 30, where it cools, condenses, and drops in pressure. This pressure drop in the cooling chamber causes a vacuum action and assists in drawing the relatively warm vapor from within the tank through vapor intake line 18 and then into the cooling chamber 30. The cooled vapor is then blown through the vapor return line 38 and back into the tank by the fan 20, where it mixes with the warmer vapor and, thereby, decreases the overall temperature of the vapor 12V in the tank. Any vapor which converts to a liquid state 12L in the cooling chamber will trickle back through vapor return line 38 and into the interior of the tank 10.

As a result of the decrease in the tank vapor temperature, the tank vapor pressure drops correspondingly and the differential between the ambient pressure and the tank vapor pressure grows until it reaches the preset maximum threshold parameter and switch 22 causes the fan motor 21 to shut off, thereby eliminating the circulation of the vapor 12V through the cooling chamber 30.

In order to prevent the fan 20 from operating when the ambient air temperature is near or below freezing, the temperature switch 26 is set to override the pressure switch 22 and shut off the fan motor 21 when the ambient temperature drops, for example, below 35 degrees fahrenheit. In order to prevent any water particles in the tank vapor from freezing in the cooling chamber 30 and, thereby, clogging up either the vapor intake line 18 or vapor return line 38 with ice, the cooling chamber temperature is regulated via switch 36, which is set to shut off the refrigeration plant 34 if the temperature within the cooling chamber nears, for instance, 35 degrees fahrenheit.

While an exemplary embodiment of the present invention and its application to control the vapor pressure of a fuel tank has been shown and described, it would be apparent to those skilled in the art that many more modifications are possible without departing from the inventive concepts herein. The described embodiment of the invention is only considered to be preferred and illustrative of the inventive concept; and the scope of the invention is not to be restricted to such an embodiment. Various and numerous other arrangements may be devised by one skilled in the art without departing from the spirit and scope of the invention.

For example, although the illustrated embodiment of the invention utilizes a fan circulating the tank vapor through a cooling chamber, other methods to cool the vapor may be used without departing from the inventive concept of placing a cooling means in closed communication with the tank vapor. For instance, a refrigerated, condensing coil may be placed directly in the storage tank to cool the vapor, wherein the coil is caused to be chilled under the same conditions as the fan is caused to be operated in the embodiment described herein. Also, the particular arrangement of the apparatus for circulating the tank vapor through the cooling chamber may be greatly varied with the creative use of commonly known piping and ducting arrangements.

Further, the present invention is equally suitable to be utilized in non fuel storage tank arrangements, such as to control the vapor pressure within any pressure sensitive vessel containing pressurized vapor. The invention, therefore, is not to be restricted except in the spirit of the appended claims.

What is claimed is:

1. A vapor pressure control system for a storage tank containing vapor, comprising:
    means for cooling the vapor provided in closed communication with the vapor in the tank; and
    a fan interposed between, and in direct communication with, the tank and said cooling means.

2. A vapor pressure control system for controlling the pressure in a fuel storage tank containing fuel which is in at least partially a vapor state, said system comprising:
    a cooling chamber for cooling the fuel vapor;
    a vapor intake line located between the tank and said cooling chamber; and
    a fan interposed in said vapor intake line between the tank and said cooling chamber.

3. A vapor pressure control system as recited in claim 2, further including means which cause the fan to operate, and thereby circulate the fuel vapor between the tank and said cooling chamber, only if the difference between the ambient air pressure and the vapor pressure in the tank falls below a certain, minimum level.

4. A vapor pressure control system as recited in claim 3, wherein said means which cause the fan to operate include a first pressure transducer which measures the ambient air pressure, a second pressure transducer which measures the vapor pressure in the tank, and a pressure sensitive switch which is connected to said first and second pressure transducers and causes the fan to operate if the difference between the ambient air pressure and tank vapor pressure falls below a certain, minimum level.

5. A vapor pressure control system as recited in claim 4, wherein said pressure sensitive switch causes the fan to cease operating if the difference between the ambient air pressure and tank vapor pressure rises above a certain, maximum level.

6. A vapor pressure control system as recited in claim 4, further comprising a temperature sensitive switch capable of measuring the ambient temperature, wherein said temperature sensitive switch causes the fan to cease operating if the ambient temperature falls below a certain, minimum level, regardless of the difference between the ambient air pressure and tank vapor pressure.

7. A vapor pressure control system for controlling the pressure of fuel vapor in a fuel storage tank, comprising:
    a cooling chamber for cooling the fuel vapor, said cooling chamber having means to regulate its temperature;
    a vapor intake line located between the tank and said cooling chamber and allowing communication of fuel vapor between the tank and said cooling chamber;
    a fan interposed in said vapor intake line between the tank and said cooling chamber and, when caused to operate, which causes the circulation of the fuel vapor between the tank and said cooling chamber;
    a pressure sensitive switch which causes the fan to operate if the difference between the ambient air pressure and tank vapor pressure falls below a certain, minimum level, and which causes the fan to cease operating if the difference between the ambient air pressure and tank vapor pressure rises above a certain, maximum level; and a temperature sensitive switch which is capable of measuring the ambient temperature and which causes the fan to cease operating when the ambient temperature falls below a certain, minimum level, regardless of the difference between the ambient air pressure and tank vapor pressure.

8. A method for maintaining a vacuum in a fuel storage tank in order to facilitate the dispensing of fuel from the tank, comprising the steps of:

providing a chilled chamber;

providing a first passageway between the tank and the chilled chamber for allowing fuel vapor in the tank to enter the chilled chamber;

providing a second passageway between the chilled chamber and the tank for allowing fuel vapor in the chilled chamber to return to the tank;

providing a fan within the first passageway which, when operating, will cause the fuel vapor to circulate from the tank, through the first passageway into the chilled chamber, and then through the second passageway back into the tank; and providing a pressure sensitive switch which is capable of measuring the difference between the ambient air pressure and the vapor pressure inside the tank and which causes the fan to operate when the difference in pressure falls below a level required to maintain a sufficient vacuum in the tank.

* * * * *